BEST AVAILABLE COPY
No. 807,175. PATENTED DEC. 12, 1905.
C. DE KANDÓ.
MULTIPLE CASCADE DRIVING SYSTEM OF ROTARY CURRENT MOTORS.
APPLICATION FILED OCT. 14, 1903.
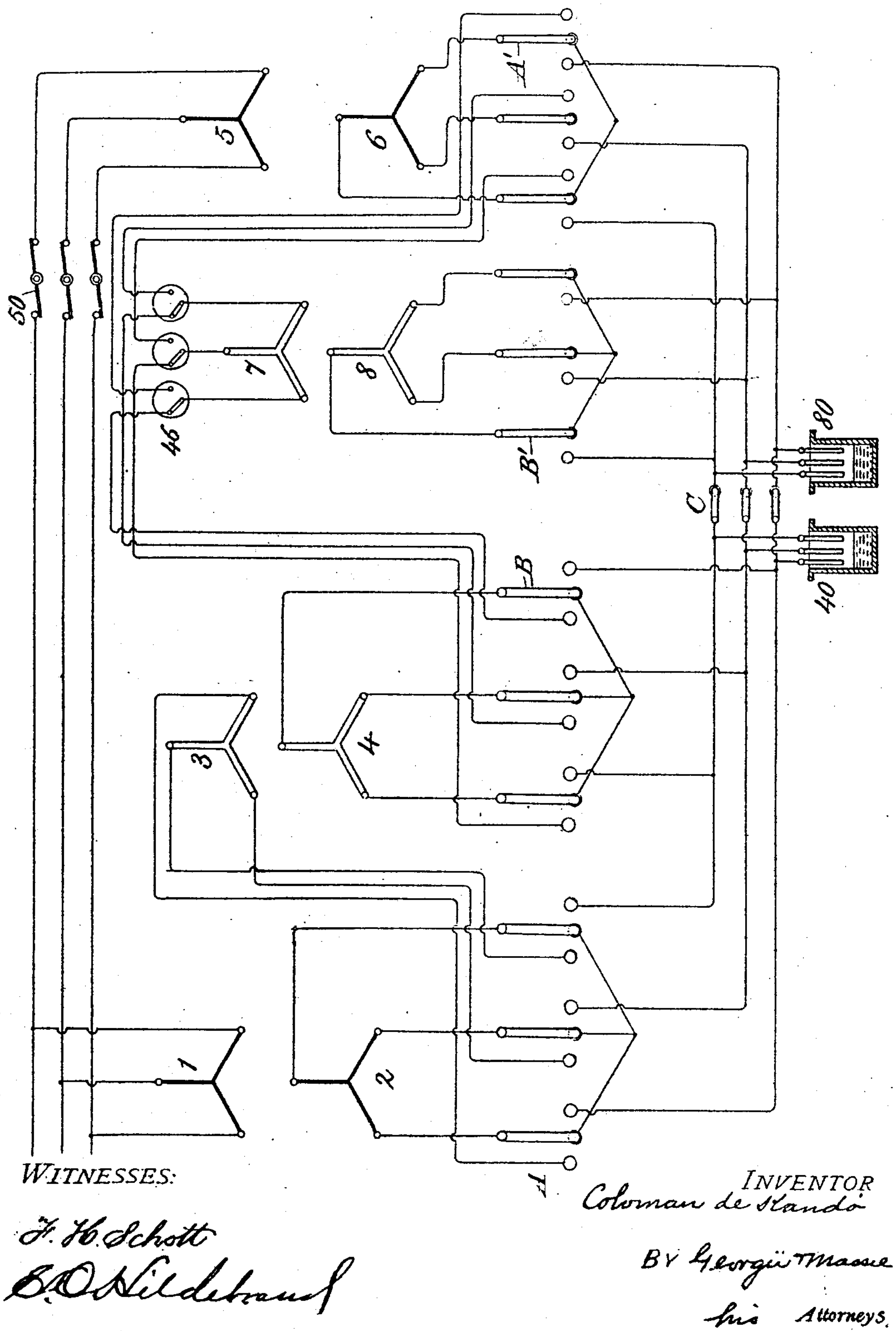
WITNESSES:
F. H. Schott
E. O. Hildebrand
INVENTOR
Colomau de Kandó
BY Georgii Massie
his Attorneys.

BEST AVAILABLE COP'

UNITED STATES PATENT OFFICE.

COLOMAN DE KANDÓ, OF BUDAPEST, AUSTRIA-HUNGARY, ASSIGNOR TO RAILWAY ELECTRIC POWER COMPANY, A CORPORATION OF MAINE.

MULTIPLE-CASCADE DRIVING SYSTEM OF ROTARY CURRENT-MOTORS.

No. 807,175. Specification of Letters Patent. Patented Dec. 12, 1905.

Application filed October 14, 1903. Serial No. 177,084.

*To all whom it may concern:*

Be it known that I, COLOMAN DE KANDÓ, engineer, residing at Budapest, in the Empire of Austria-Hungary, have invented certain new and useful Improvements in or Relating to Multiple-Cascade Driving Systems of Rotary Current-Motors, of which the following is a full and clear specification.

My invention relates to improvements in means for controlling rotary field-motors.

It has been common in the art heretofore to arrange a plurality of rotary field-motors in a cascade—that is to say, in such a manner that one motor, the primary or leading motor, takes the current from the source of supply, while the induced member of said primary motor is connected to the inducing member of the next motor in the cascade, and so on, according to the number of motors thus connected in cascade, provision being made so that the ultimate motor of the plurality of motors forming the cascade may have its induced or secondary member connected in circuit with a starting resistance, usually a non-inductive resistance. By such an arrangement as many different efficient speeds may be obtained as there are motors in the cascade. For example, with two motors two different speeds may be obtained, with three motors in cascade three different speeds may be obtained, and so on according to the number of motors. Such an arrangement, however, has the disadvantage, especially in the propulsion of vehicles, that when the higher speeds are being used some of the motors of the cascade are not in use, and hence are a mere dead-weight on the vehicle. Furthermore, as the power of the cascade increases with the increase in number of motors in the cascade it follows that with system a cascade of the usual kind the propelling power is greatest at the smallest speed, since at such speed the number of motors in the cascade is greatest. Such an arrangement is unsatisfactory for use in connection with electric railways, because in such railways it is desirable, and in fact necessary, to have the greatest propelling power at the normal speed under maximum loads, while at the same time providing for a higher speed at light loads and for a low speed when switching cars or trains.

My invention is designed to avoid the above-mentioned disadvantages of the usual cascade arrangement, while retaining all the advantages of the same; and it consists in providing a number of motors arranged in a plurality of cascades, each cascade containing, of course, a plurality of motors, means being provided whereby the leading motor in a motor-cascade can be cut off from the supply-line and a motor or motors in such cascade can be switched out of its own cascade into another cascade to lower the speed of the motors in the latter cascade. For example, if a train be provided with two cascades, each containing two motors, three speeds can be obtained from this arrangement—namely, first, the highest speed with only the two leading or primary motors of the cascades in operation, the propelling power being that due to the operation of these two leading motors; second, an intermediate speed due to the employment of the two motors in each cascade, whereby a propelling power of four motors is obtained at said intermediate speed, which may be termed the "normal" speed, and, third, a low-speed with the leading motor of one cascade cut off from the source of supply and the second motor of said cascade switched off from its own cascade into the other cascade, which thereby becomes a single cascade of three motors. In the latter case the propelling power is that due to the operation of three motors at the slow speed. It will be seen that in this way all the motors are employed under normal conditions—viz., when propelling the vehicle with normal loads at normal speeds—while, on the other hand, a train so equipped may be efficiently operated in express-train service and will have sufficient propelling power for the usual conditions of such service, while at the same time such a train is efficient and sufficiently provided with propelling power at low speeds, such as required in switching.

It is to be understood, of course, that the usual starting resistances may be and are intended to be employed in connection with my system, as in the usual cascade arrangement.

My invention will now be more particularly described in connection with the accom-

BEST AVAILABLE COPY panying drawing, which is a diagrammatic view of a system having two cascades of motors, each cascade consisting of two motors.

In the drawing, 1 is an inducing-coil of a motor fed from the main conductors, and 2 is the induced coil of the same motor. This motor is the primary or leading motor of what I will term the "first" cascade.

At 3 is indicated the inducing-coil of the second motor and is arranged to receive its current from the induced member 2 of the primary motor in the usual way. At 4 is shown the induced coil of the said second motor of the first cascade.

At 5 is indicated the inducing-coil of the leading motor of the second cascade. 6 is the induced coil of said motor.

7 is the inducing-coil of the second motor of the second cascade arranged to receive its current from the induced member 6 of its leading motor, and 8 is the induced coil of said second motor of the second cascade.

40 is the starting resistance of the first motor-cascade, which comprises the parts 1, 2, 3, and 4, and 80 is the starting resistance of the second motor-cascade having the parts 5, 6, 7, and 8.

At 46 is indicated a triple commutator or switching device arranged to connect either the coil 4 or the coil 6 with the coil 7, while at 50 is shown a circuit interrupter or switch whereby the leading motor of the second cascade may have its inducing-coil 5 connected to or disconnected from the source of supply.

At A and A′ are indicated commutators or switches by means of which the induced members of the leading motors of both cascades may be run independently of the remaining motors of their cascades, each switch A or A′ permitting the connection of the induced member 2 or 6 of its leading motor with either the inducing member 3 or 7 of its corresponding following motor or with the corresponding starting resistance 40 or 80 or of allowing said induced member 2 or 6 to be short-circuited on itself. Similar switches B and B′ are provided for controlling the induced members 4 and 8, respectively, of the second motors of each cascade.

A triple switch C is provided between the two starting resistances in order that when the second motor 7 8 of the second cascade is switched into the first cascade as a third motor of such first cascade the two starting resistances may be thrown in parallel with each other for the purpose of lessening the development of heat during the starting operation.

It is to be understood that the special construction and arrangement of the switches A, A′, B, B′, and C form no part of my invention.

Having thus fully described my invention, what I claim as new, and desire to secure by Letters Patent of the United States, is—

1. The combination, with a plurality of motor-cascades, and a source of supply to which the leading motor of each motor-cascade is connected, of means for switching a motor of one motor-cascade into another of the motor-cascades.

2. The combination, with a plurality of motor-cascades, each comprising a plurality of motors, a source of supply to which each cascade may be connected, and means for disconnecting one of said motor-cascades from the source of supply, of means for switching one of the motors of the latter cascade into another of the motor-cascades.

3. In a system of rotary current-motors, the combination of a plurality of cascade systems, the primary motors of which are wound for direct connection with the line and the secondary motors of which are wound for connection with the secondaries of the primary motors, with means for connecting a secondary motor of one system as a cascade-motor of higher order in another system.

4. In a system of rotary current-motors, the combination of a plurality of cascade systems, the primary motors of which are wound for direct connection with the line and the secondary motors of which are wound for connection with the secondaries of the primary motors, with means for connecting the secondary motors of two or more systems in cascade relation with one primary motor.

5. The combination, with a plurality of motor-cascades, of means for switching one of the secondary motors of one cascade into the other cascade.

In witness whereof I have hereunto set my hand in the presence of two witnesses.

COLOMAN DE KANDÓ.

Witnesses:
EUGENE HARSAUYE,
T. LA GUORDIA.

Corrections in Letters Patent No. 807,175.

It is hereby certified that in Letters Patent No. 807,175, granted December 12, 1905, upon the application of Coloman DeKandó, of Budapest, Austria-Hungary, for an improvement in "Multiple-Cascade Driving Systems of Rotary Current-Motors," errors appear in the printed specification requiring correction, as follows: On page 1, line 40, the word "system" should be stricken out and inserted after the word "cascade" in line 41, same page; and on page 2, line 52, a comma should be inserted between the numerals 7 and 8; and that the said Letters Patent should be read with these corrections therein that the same may conform to the record of the case in the Patent Office.

Signed and sealed this 2nd day of January, A. D., 1906.

[SEAL.] W. W. Mortimer
Chief Div. B.

F. I. ALLEN,
*Commissioner of Patents.*